(No Model.)
E. THOMSON.
METHOD OF ELECTRIC WELDING.
No. 396,011. Patented Jan. 8, 1889.
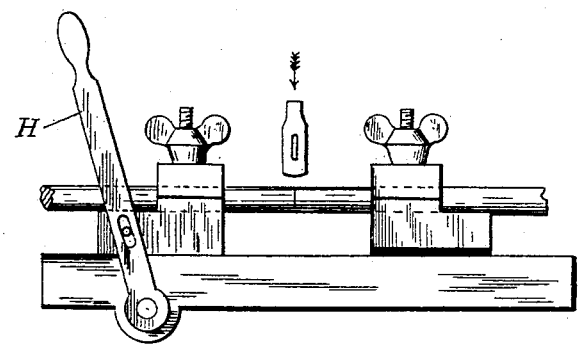
WITNESSES:
Ira R. Steward,
Wm. H. Capel.
INVENTOR
ELIHU THOMSON
BY
Townsend & MacArthur
ATTORNEYS

UNITED STATES PATENT OFFICE.

ELIHU THOMSON, OF LYNN, MASSACHUSETTS.

METHOD OF ELECTRIC WELDING.

SPECIFICATION forming part of Letters Patent No. 396,011, dated January 8, 1889.

Application filed May 15, 1888. Serial No. 273,989. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Welding, of which the following is a specification.

My invention relates to a process of electric welding in which a heating electric current is passed through the parts to be welded, and pressure is applied when the parts are at the proper welding temperature. Such a process is described in my prior patents, Nos. 347,140, 347,141, and 347,142.

My present invention relates more particularly to the process of forming a finished weld or joint; and it consists, essentially, in removing the pressure by which the weld is produced and then hammering, shaping, or otherwise manipulating the metal pieces, as desired, while they are heated or kept hot by a suitable electric current passing through them. By the removal of the pressure the further approach of the pieces is prevented during the final working. The heating-current for the final operation may be less than that required to produce the welding temperature. Instead of simply removing the pressure a force may be applied which will tend to separate the pieces. If this force is not too great, it will facilitate the final work by allowing spreading of the metal while heated by an electric current passing through it.

My invention may be carried out by the apparatus described in my prior patents before referred to, or by the use of the holding-clamps shown in the accompanying drawing, a suitable source of heating electric current being used, as is now well understood in the art.

The current may be graduated or regulated by any means known in the art—as, for instance, by varying the magnetic field of the dynamo-machine which gives the current energy; by varying the resistance interposed in the circuit of the welding-currents; by varying the resistance or the inductive resistance in either the primary or secondary of the induction coil or converter when the converter is used for developing the welding-current of large volume, by varying the reaction or self-induction of the armature or welding-circuit when alternating currents derived directly from a dynamo-machine are employed; by varying the inductive relation of the primary and secondary of the converter through changes in their relative position, or in the mass or position of the mass of iron of the converter; by varying the speed of the dynamo from which the current is directly or indirectly derived; by varying the position of the commutator of the dynamo, or by any other desired means.

In the drawing two ordinary holding-clamps are shown, but one of them is provided with a handle, H, by which pressure may be applied tending to force the piece held by the clamp toward or away from the piece held by the other clamp.

In practicing my invention the following course may be followed: The two pieces to be united having been placed in the clamps and united by pressure applied while they are heated by the current, the pressure is removed, and the pieces being still connected to the welding-circuit the adjusting or regulating appliances are manipulated so as to cause a current of sufficient volume to flow for keeping the pieces hot. While so heated they are subjected to the desired hammering, shaping, or other operation.

It is sometimes preferable to apply force by means of the handle H in a direction to tend to separate the pieces during the hammering or other operation.

I do not limit myself as to the degree of heat employed during the hammering operation, and although I prefer to perform the final operation while the pieces are still heated by the current used in welding, I do not limit myself to so doing, since obviously the pieces might be allowed to cool and be afterward again heated and then hammered.

What I claim as my invention is—

1. The herein-described method of forming a finished joint between two pieces of metal, consisting in heating the joint by an electric current passed through the same, applying pressure while the metal is in a heated condition, removing the pressure, and then hammering and shaping the metal while subjected to a heating electric current.

2. The herein-described method of finishing an electric weld, consisting in removing the pressure by which the weld is effected, and then hammering or shaping or otherwise working the pieces while they are traversed by a heating electric current.

3. The herein-described method of finishing an electrically-welded joint, consisting in simultaneously applying a heating electric current, and a force tending to separate the joint while subjecting the joint to the hammering or other operation.

Signed at Lynn, in the county of Essex and State of Massachusetts, this 11th day of May, A. D. 1888.

ELIHU THOMSON.

Witnesses:
J. W. GIBBONEY,
F. R. HILL.